(12) United States Patent
Paré et al.

(10) Patent No.: US 8,613,326 B2
(45) Date of Patent: Dec. 24, 2013

(54) WEEDER

(75) Inventors: Richard Paré, Boucherville (CA);
 François Gaucher, Beloeil (CA);
 Benoit Orban, St. Lambert (CA);
 Patrick Mainville, Montreal (CA);
 David Boies, Levis (CA); Patrick Julien, Levis (CA)

(73) Assignee: Garant GP, Saint-François (CA)

( * ) Notice: Subject to any disclaimer, the term of this patent is extended or adjusted under 35 U.S.C. 154(b) by 254 days.

(21) Appl. No.: 13/031,465

(22) Filed: Feb. 21, 2011

(65) Prior Publication Data

US 2011/0203815 A1 Aug. 25, 2011

Related U.S. Application Data

(60) Provisional application No. 61/306,112, filed on Feb. 19, 2010.

(51) Int. Cl.
 *A01B 33/00* (2006.01)

(52) U.S. Cl.
 USPC .................. 172/41; 111/96; 172/378

(58) Field of Classification Search
 USPC .................. 172/41, 371, 378; 111/96; 7/114
 See application file for complete search history.

(56) References Cited

U.S. PATENT DOCUMENTS

| 547,679 | A | * | 10/1895 | Read | 294/50.6 |
| 843,399 | A | * | 2/1907 | King | 294/50.6 |
| 1,501,965 | A | * | 7/1924 | Moors | 294/50.5 |
| 1,924,002 | A | * | 8/1933 | Rush | 294/50.6 |
| 1,927,871 | A | * | 9/1933 | Irwin et al. | 73/864.43 |
| 2,635,001 | A | * | 4/1953 | Slinkman | 294/50.5 |
| 2,689,762 | A | * | 9/1954 | Krumm | 294/50.6 |
| 2,779,259 | A | * | 1/1957 | Kelsey | 172/41 |
| 2,809,067 | A | * | 10/1957 | Macchi | 294/50.7 |
| 2,812,969 | A | * | 11/1957 | Fornelius | 294/50.7 |
| 2,855,668 | A | * | 10/1958 | Ottenad et al. | 30/276 |
| 3,129,771 | A | * | 4/1964 | Lidstone | 172/25 |
| 3,198,719 | A | * | 8/1965 | Stewart | 294/50.5 |
| 3,443,830 | A | * | 5/1969 | Jones | 294/50.7 |
| 3,525,546 | A | * | 8/1970 | Lowell | 294/50.7 |
| 3,847,227 | A | * | 11/1974 | Myers | 172/378 |
| 4,641,712 | A | * | 2/1987 | Cravotta | 172/25 |
| 4,715,634 | A | * | 12/1987 | Mueller et al. | 294/50.5 |
| 4,723,802 | A | * | 2/1988 | Fambrough | 294/50.6 |
| 4,822,088 | A | * | 4/1989 | Price | 294/50.7 |

(Continued)

FOREIGN PATENT DOCUMENTS

CA 2 578 288 3/2006

*Primary Examiner* — Jamie L McGowan
(74) *Attorney, Agent, or Firm* — Goudreau Gage Dubuc; Gwendoline Bruneau

(57) ABSTRACT

A weeding hand tool, comprising a generally longitudinal member joining a handle grip at a first end thereof and a pedal at a second opposite end thereof, a finger head comprising coiled fingers arranged in a helix and an ejector rod mobile inside the helix, and an ejector arm, wherein, when the tool is positioned generally vertically with free end tips of the coiled fingers on the ground, pushing down on the handle grip and/or on the pedal causes the coiled fingers to rotated down into the soil, entrapping a weed beneath the soil as they penetrate the soil, and wherein when, by pulling up on the longitudinal member, the coiled fingers are pulled out from the soil, with the weed entrapped in the helix they form, and the weed is ejected from the helix pulling down on the ejector arm.

21 Claims, 5 Drawing Sheets

(56) References Cited

U.S. PATENT DOCUMENTS

| | | | |
|---|---|---|---|
| 4,974,682 A * | 12/1990 | Hoffman | 172/22 |
| 5,004,283 A * | 4/1991 | Sullivan | 294/61 |
| 5,234,241 A | 8/1993 | Ikerd | |
| 5,330,010 A * | 7/1994 | Smotherman | 172/25 |
| 5,441,118 A | 8/1995 | Cruz, Jr. | |
| 5,706,900 A * | 1/1998 | Liao | 172/378 |
| 5,988,292 A * | 11/1999 | Knotts | 172/41 |
| 6,076,614 A | 6/2000 | Gracy | |
| 6,257,346 B1 | 7/2001 | Schofield et al. | |
| 6,330,921 B1 | 12/2001 | Barber | |
| 6,349,776 B1 | 2/2002 | Hus | |
| 6,595,298 B1 * | 7/2003 | Crady | 172/41 |
| 6,662,879 B1 | 12/2003 | Costa | |
| 6,739,401 B1 | 5/2004 | Sova | |
| 6,827,153 B2 | 12/2004 | Constable | |
| 6,951,254 B2 | 10/2005 | Morrison | |
| 7,063,168 B2 | 6/2006 | Paloheimo et al. | |
| 7,117,954 B2 | 10/2006 | Vipond | |
| 7,314,095 B2 | 1/2008 | Cobb | |
| 7,344,171 B1 | 3/2008 | McMullan | |
| 7,347,276 B2 | 3/2008 | Basek | |
| 7,748,470 B2 * | 7/2010 | Ortiz | 172/13 |
| 7,845,696 B2 | 12/2010 | Hatcher et al. | |
| D657,212 S * | 4/2012 | Pare et al. | D8/8 |
| 2001/0000881 A1 * | 5/2001 | Marshall et al. | 172/41 |
| 2002/0108762 A1 * | 8/2002 | Lynch | 172/22 |
| 2004/0089334 A1 * | 5/2004 | Ko | 135/77 |
| 2008/0135267 A1 * | 6/2008 | Karczewski | 172/378 |
| 2008/0149358 A1 * | 6/2008 | Catlin | 172/41 |
| 2008/0172801 A1 * | 7/2008 | Biag | 7/114 |

* cited by examiner

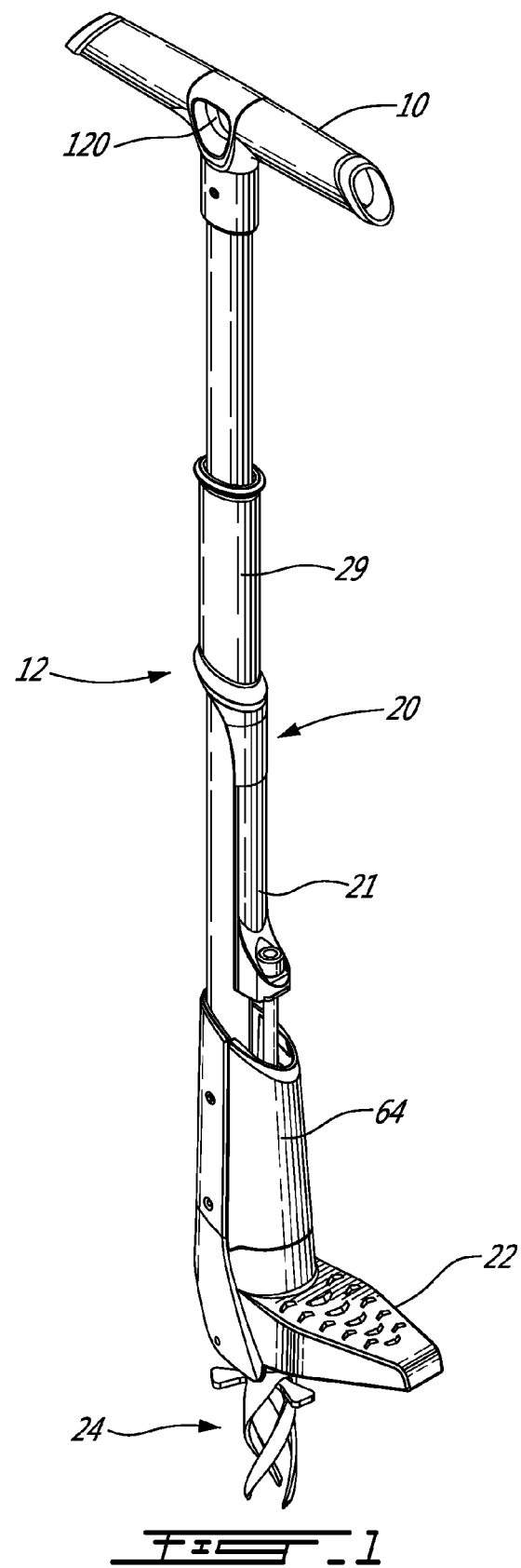

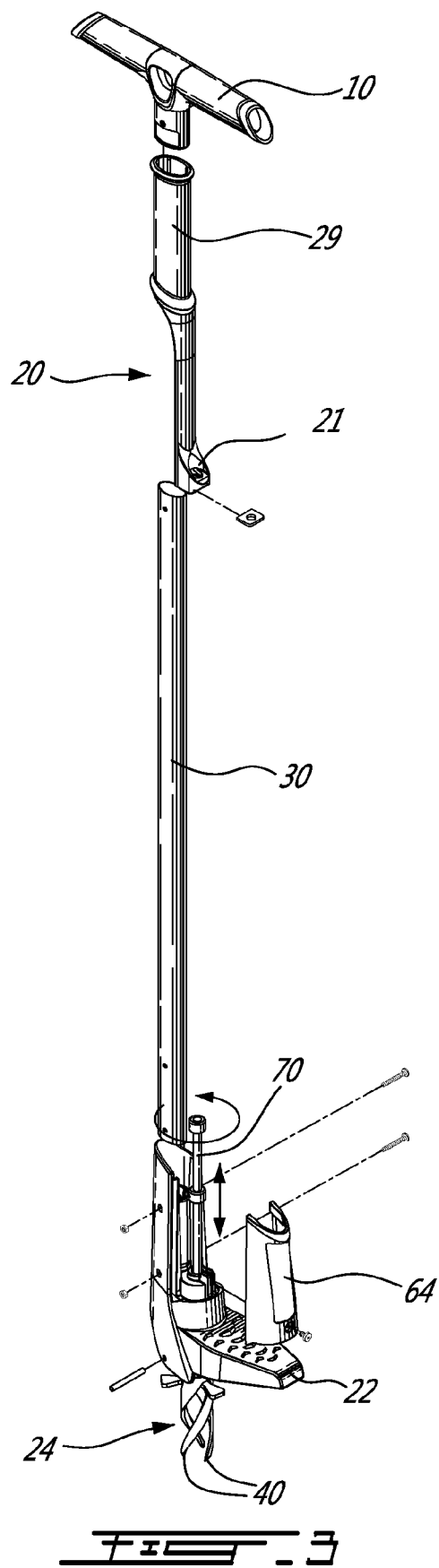

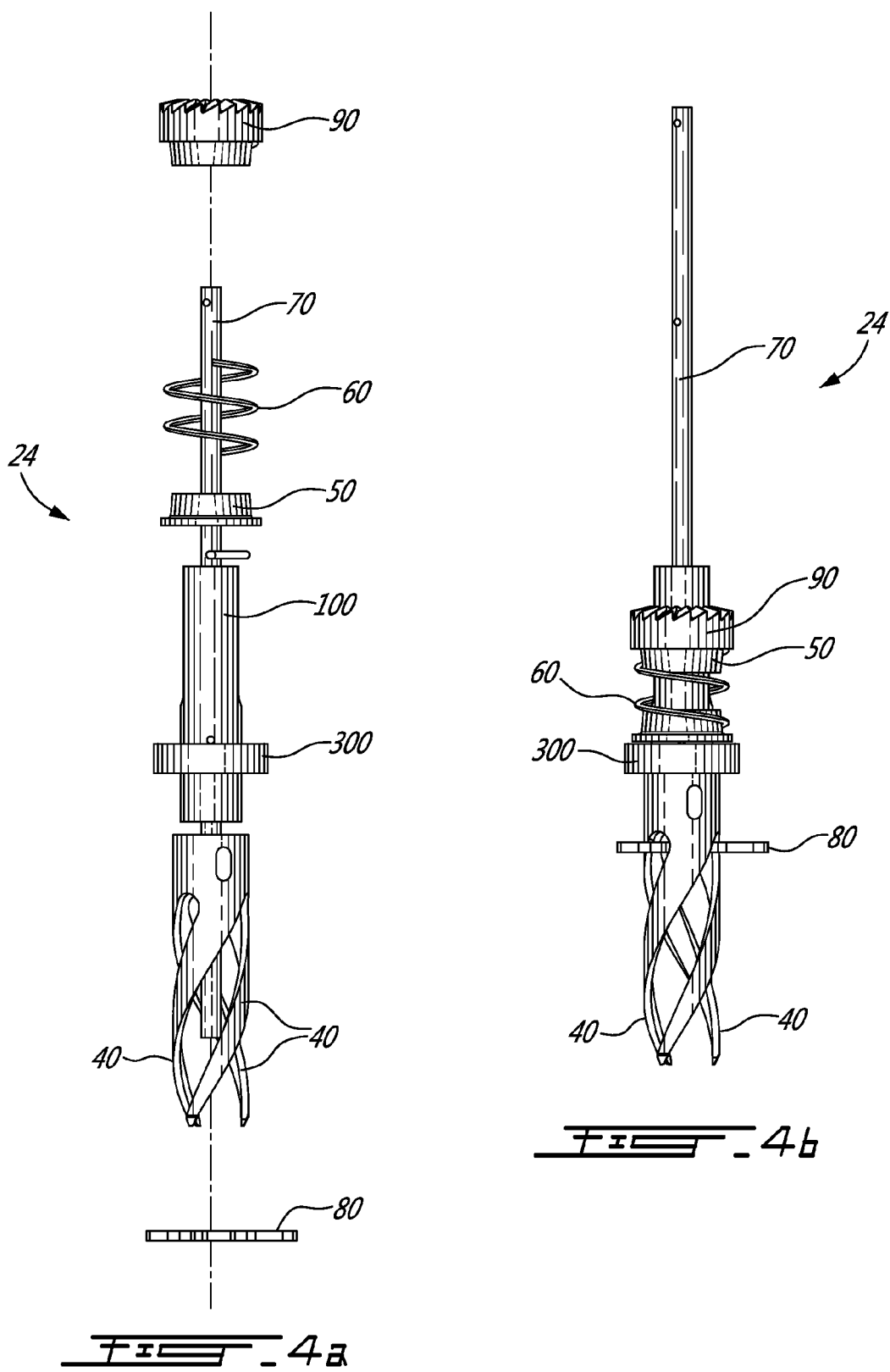

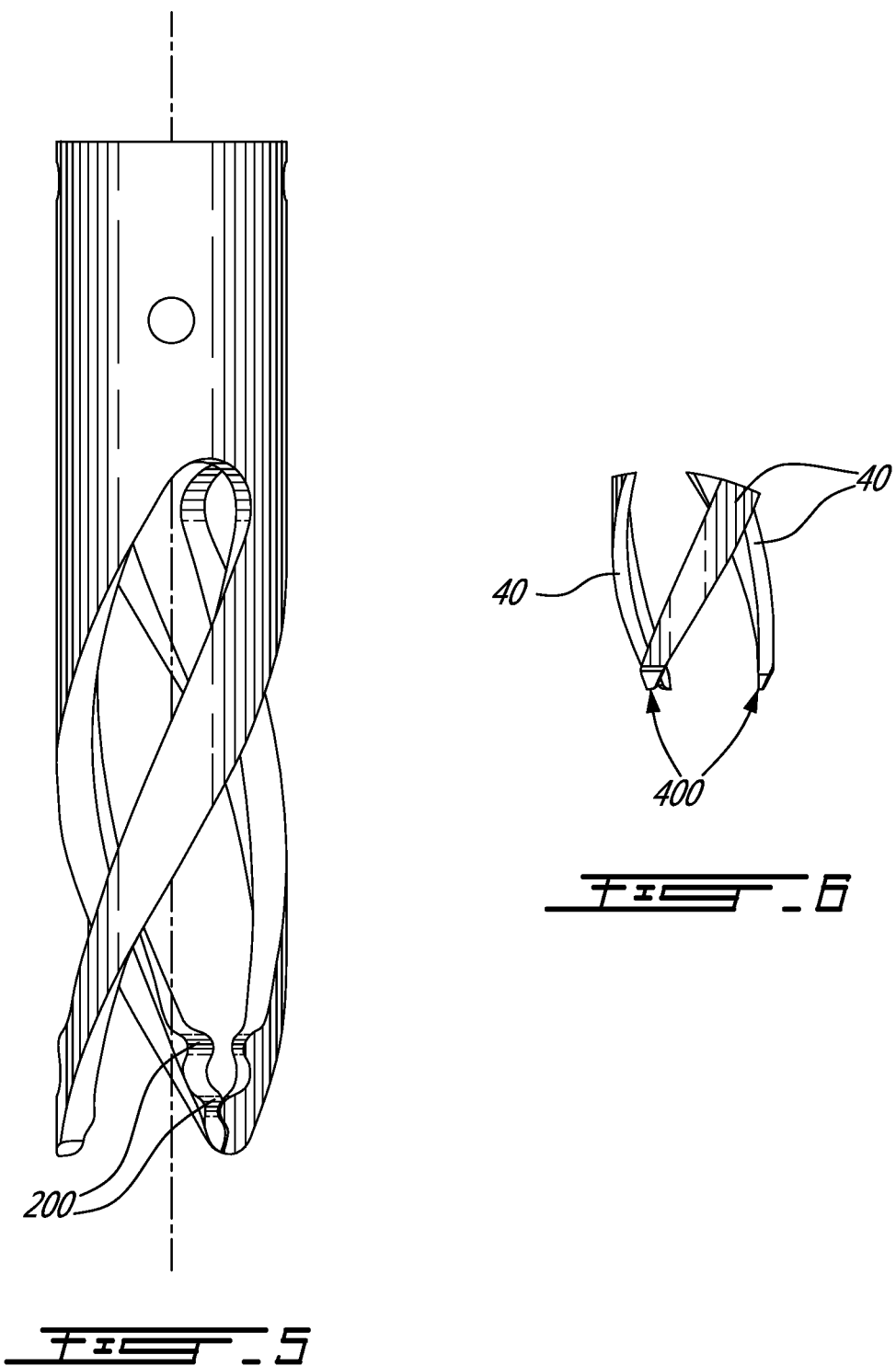

WEEDER

CROSS REFERENCE TO RELATED APPLICATIONS

This application claims benefit of U.S. provisional application Ser. No. 61/306,112, filed on Feb. 19, 2010. All documents above are incorporated herein in their entirety by reference.

FIELD OF THE INVENTION

The present invention relates to tools for removing weeds or plants from the ground. More specifically, the present invention is concerned with weeding hand tools.

BACKGROUND OF THE INVENTION

A number of tools have been developed for removing weeds from gardens and lawns in place of using efficient, but potentially toxic chemicals. Such tools include weeding tools, weed pullers, weed poppers, weed twisters, and weed hoes. Each tool has different advantages and usually focuses on different plant removal situations, depending on the plant types and of the nature, for example the hardness or compaction, of the terrain.

Weed pullers and weed poppers are weed removal tools that remove plants by their roots. They typically comprise a means to penetrate the soil and grab or remove the root.

Some tools comprise a part for digging down the soil close to the weed on one side thereof, and a blade that goes down into the soil, on the opposite side of the weed, thereby grabbing off the roots of the weed, which can then be pulled out from the soil by lifting on the tool, the weed being gripped between the part for digging and the blade, as in a claw.

Other tools are of the screw-pull type, wherein the part for digging down the soil grips the weed underground and the weed is removed by pulling on the tool.

The present description refers to a number of documents, the content of which is herein incorporated by reference in their entirety.

SUMMARY OF THE INVENTION

More specifically, in accordance with the present invention, there is provided a weeding hand tool, comprising a handle grip; a pedal; a generally longitudinal member joining the handle grip at a first end thereof and a pedal at a second opposite end thereof; a finger head comprising coiled fingers arranged in a helix and an ejector rod mobile inside the helix; and an ejector arm, mobile in translation relative to the longitudinal member and connected to the finger head at a first end of the ejector rod; wherein, when the tool is positioned generally vertically with free end tips of the coiled fingers on the ground, pushing down on at least one of the handle grip and the pedal causes the coiled fingers to rotated down into the soil, entrapping a weed beneath the soil as they penetrate the soil, and wherein when, by pulling up on the longitudinal member, the coiled fingers are withdrawn out from the soil, with the weed entrapped in the helix they form, the unearthed entrapped weed is ejected from the helix by the ejector rod by pulling down on the ejector arm.

There is further provided a method for extracting a plant from the ground with a hand tool comprising a generally longitudinal member provided with a pedal, a finger head comprising coiled fingers arranged in a helix and an ejector rod mobile inside the helix, and an ejector arm mobile in translation relative to the longitudinal member and the pedal and connected to the finger head at a first end of the ejector rod, comprising positioning the tool generally vertically with the finger head generally surrounding the plant to be removed; rotating down the coiled fingers into the ground by at least one of: i) pressing down on the pedal, ii) pressing down on the longitudinal member and iii) rotating counter-clockwise and clockwise the handle grip in a ratcheting action; and pulling on the generally longitudinal member, thereby lifting up the tool and pulling the fingers up out of the soil; and operating the ejector arm to unwind the uprooted unearthed plant from the coiled fingers.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 is a perspective view of a tool according to an embodiment of an aspect of the present invention;

FIG. 3 is an exploded view of the tool of FIG. 1;

FIG. 4 show a) a partly exploded view and b) a perspective view, of a finger head for a tool according to an embodiment of an aspect of the present invention;

FIG. 5 is a perspective view, of a finger head for a tool according to an embodiment of an aspect of the present invention; and FIG. 6 is a close-up view of fingers of a finger head for a tool according to an embodiment of an aspect of the present invention.

DESCRIPTION OF ILLUSTRATIVE EMBODIMENTS

The present invention is illustrated in further details by the following non-limiting examples.

As illustrated in FIG. 1, the tool generally comprises a handle grip 10, a main body 12 and a finger head 24.

Figure 2A:
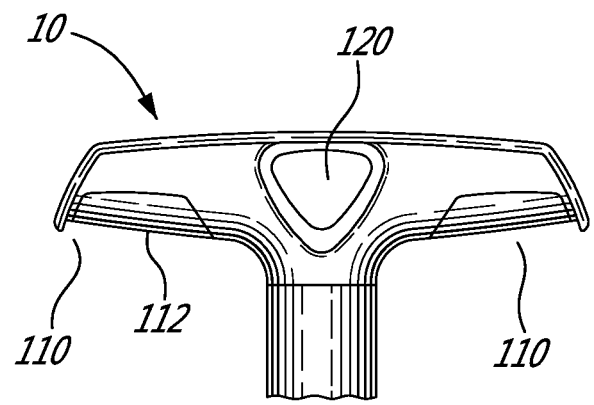
FIG. 2 are views of a handle grip for a tool according to an embodiment of an aspect of the present invention.
Figure 2B:
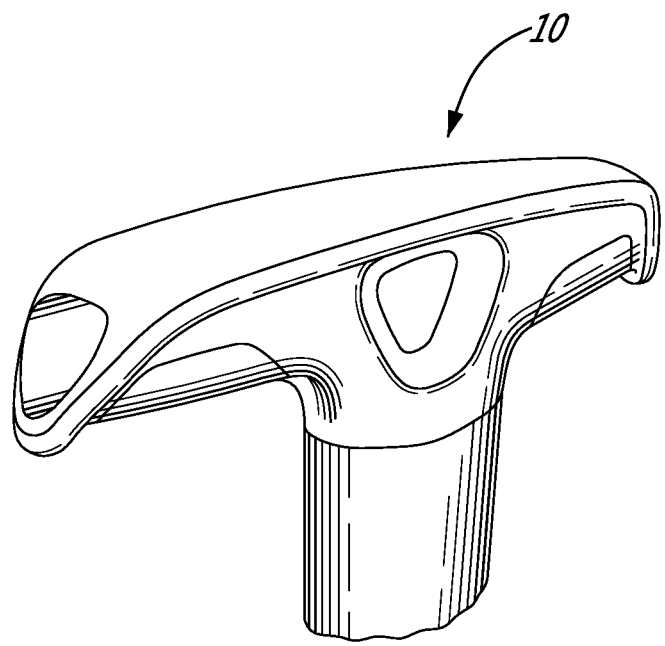

The handle grip 10 may be of a general T shape, as illustrated in FIG. 2b for example, for a comfortable handling of the tool by a user, without interference with the user's legs or body. As shown in FIG. 2a for example, edges 110 and underneath surfaces 112 of the handle grip 10 may be designed for a comfortable grip by the user. An aperture 120 may be provided in the body of the handle grip 10 for hanging the tool during storage for example.

As best seen in FIG. 3, the main body 12 is generally a tubular member, between the handle grip 10 and the finger head 24. It comprises a main tube 30, a pedal 22 and an ejector arm 20. The pedal 22 is fixed relative to the main tube 30, while the ejector arm 20 is mobile relative to the main tube 30 and the pedal 22.

The ejector arm 20 is illustrated herein as a sliding sleeve of the shot-gun type, exterior to the main tube 30, for example, and comprising a grip 29 for the user and a tongue 21 connected to the finger head 24 at the end of the main tube 30 opposite the grip 29. Other configuration may be contemplated.

As best seen in FIG. 4, the finger head 24 comprises an ejector rod 70 mobile within a main shaft 100, with an ejector, shown for example as an ejector plate 80, at the end thereof, welded at the end of the ejector rod 70 example, and coiled helix fingers 40 secured at the end of the main shaft 100, by welding for example, with a bearing 300. The main shaft 100 supports a ratchet assembly comprising, between the bearing 300 and the pedal 22 secured about the main shaft 100 by a ratchet ring 90, a compression spring 60 and a compression ring 50. The assembly is housed behind a cover 64, as illustrated in FIGS. 1 and 3 for example. As people in the art will appreciate, this assembly could have other configurations.

The helix formed by the fingers 40 is mobile in rotation about axis 70, only in one direction: rotation thereof is blocked in the opposite direction. It is fixed in translation, relative to the pedal 22. The ejector arm 20 and the ejector plate 80 are mobile in translation relative to the main tube 30.

The coiled helix fingers 40 may be cut out from a steel tube, using a laser or by die and punch for example, the tube being quenched and annealed to desired mechanical properties. Alternatively, the coiled helix fingers 40 may be formed starting from a steel sheet, by cutting out the shape of each finger in the sheet, then folding the sheet into a tube and welding to a final shape of the finger head 24, then quenching and annealing the finger to desired mechanical properties. The thickness of the starting tube or sheet may be selected between 0.0625" and 3/16" for example.

For the tool to be effective in a variety of terrains, the target hardness of the fingers 40 may be selected between 38 and 58 Rockwell hardness C for example.

The number, shape and size of the fingers 40, as well as the pitch of the helix they form, and/or the external and internal diameters of the helix, can be adjusted for optimizing a working surface of the finger head while achieving adequate mechanical resistance.

It has been found that a finger head comprising three fingers, each finger having a varying section between about 0.1" and about 9/16", each finger having a length of about 3.75", with a pitch of about 42.67 degrees per inch and a thickness of about 0.12, and forming an helix with an inside diameter of about 1", allows an optimized ratio between the total working surface provided by the fingers and the space between the fingers for an effective extraction of the weeds out of the ground, in a range of terrains, and an effective ejection of the weeds out from the helix formed by the fingers once the weeds are uprooted.

Fingers having a generally constant section higher than about 0.375", for example between 0.5" and 0.7", or fingers with variable section and a length comprised between about 2" and about 4.5" and a pitch between about 54 degrees/inch and about 38 degrees/inch may be used.

It may be contemplated providing the tip of each finger with ribs 200 for retaining the weed (see FIG. 5), i.e. when gripping the weed underground and/or once the weed is unearthed so as to avoid dropping it inadvertently out of the helix formed by the fingers 40.

Moreover, the tip 400 of each finger 40 may be outwardly beveled, i.e. beveled towards the outside of the resulting helix (see FIG. 6). This feature is found to ease penetration of the fingers into the soil, and also to ease releasing the weed from the grip of the helix during ejection based on flexibility of the fingers. Indeed, when the finger head is inserted within the soil, the beveled tips 400 of the fingers 40 tend to tighten the fingers towards the center of the helix under the pressure of the soil. As the weed is pulled out of the soil, the fingers 40 recover their position, thereby releasing their grip on the weed, which eases its ejection form the helix.

According to an embodiment of an aspect of the present invention, a method for removing weeds comprises positioning, by a user securing the tool in position with his hands on the handle grip 10, the tool generally vertically atop the weed to be removed, with the finger head 24, i.e. the end tips of the fingers 40, generally surrounding the weed to be removed.

Then, the user, by pressing down with his feet on the pedal 22, causes the fingers 40 to rotate down into the soil. No twisting movement is needed from the user. The coiled helix fingers 40 go down, on less than a complete 360 degrees rotation, i.e. on about 150°, until the ejector plate 80 reaches the upper end of its stroke, i.e. to a depth of about 3-4 inches depending on the length of the fingers 40. Alternatively, while securing the tool generally vertically atop the weed to be removed, with the end tips of the fingers 40 generally surrounding the weed to be removed, the user may press down on the handle grip 10 with an alternating back and forth movement, generally over half a circle in the horizontal plane, which also drives the fingers 40 rotating down into the soil. The user may push on the handle grip 10 and on the pedal 22 simultaneously for ease of penetration within the ground if necessary.

As they penetrate the soil the fingers 40 entrap the root beneath the soil to a depth of about 3-4 inches. To assist or increase power of soil penetration the user can further screw down the coiled fingers 40 into the soil by rotating continuously clockwise and counterclockwise the handle grip 10 in a ratcheting movement.

Then the user lifts the tool up by pulling on the handle grip 10 with a slight clockwise turn (less than about 90 degrees), thereby withdrawing the fingers 40 up out of the soil and extracting the weed from the soil, the weed, including root and leaves, remaining trapped between the fingers 40. When pulling up on the tool, there is no back rotation of the fingers 40, since their rotation is blocked. To quickly remove the plug of dirt and the root from the tool, the user slides the ejector arm 20 down to unwind the weed from the coiled fingers 40, over a waste basket for example, so that there is no need for further cleanup. As a result, little or no pickup of debris is necessary. By pulling down on the ejector arm 20, the user drives the ejector rod 70 down and its ejector plate 80 down therewith towards the free end tips of the fingers 40. The ejector plate 80, which may comprise for example three radial arms extending from within the helix formed by the fingers 40 outwards, as illustrated for example in FIG. 4b, thus allows loosening the weed for ejection at this stage. Other configuration for the ejector plate 80 are possible, depending on the terrain. The ejector plate 80 may be, for example, a rod or a plate mobile within the helix formed by the fingers 40 and secured at the end of the ejector rod 70.

In the embodiment illustrated in FIGS. 3 and 4, the course of the ejector rod 70 is limited between an upper stop and a lower stop, which allows an impact action on the ejector rod 70 and therefore on the ejector plate 80, which may ease loosening of the weed. Indeed, this limited course gives additional kinetic energy to the ejector arm for impact on stop and additional force to the ejector plate.

The configuration of the finger head 24 and movement of the fingers 40 allow an effective penetration into the soil, with reduced friction, as well as an effective grabbing, without cutting, of the root and leaves, and entrapping of the leaves and roots. Then, after popping the weed out of the ground, the user only needs removing the weed from the tool by actuating the ejector arm 20, on top of a waste basket for example. As a result, as mentioned hereinabove, there is no need for additional cleanup of the terrain around the location of weed extraction.

The present tool therefore allows easily uprooting a weed and removing it out of the ground once uprooted. As the inner diameter of the helix described by the fingers 40 is of about 1+/−0.25 inch, the present tool allows precision and minimal soil disturbance, i.e. reduced till.

The present tool allows digging up dandelions and weeds, for example, without stooping or kneeling, by penetrating the soil, grabbing the root and pulling it efficiently, quickly and easily. Its ejector allows an effective simple ejection and disposal of the weeds after extraction. With a simple "step down, pull up" movement from the user, the fingers automatically grasp upstart plants and pluck them neatly from the soil.

The tool may have a height of about 30 inches or more, for example a height of about 36 inches at the level of the handle grip 10, which is found to allow ergonomic use and to prevent back stress during use of the tool. This height may further be adjustable, from about 32 to about 40 inches for example.

The fingers 40 may be made in stainless steel, alloyed steel, engineered plastics, aluminum and titanium for example. They may have a fin-shaped profile for improved soil penetration. However, they should not have sharp cutting edge since nor the roots or the leaves of the weeds should be cut during the uprooting or the extracting steps. Fingers coiled on about 150° over 4 inches are shown to allow the weed and leaves to slide thereon and get trapped therebetween, for an easy removal of weeds from their roots without wacking off their tops, in a range of terrains.

The present tool may reach about 3 to 4 inches deep, i.e. deep enough to reach the roots. It is easy to use and carry around. It is a standup ergonomically friendly tool, light, typically under 30 pounds for example, and easy to use, causing very little stress on the user's back and limbs. It can be applied with a minimum of force, using both hands or only one hand, allowing an average user pulling out up to about 200 weeds a day, each weed taking an average of about 5 seconds to be pulled out if used at this rate during 10 days, the present tool therefore allows pulling out about 2000 weeds a year.

Although the present invention has been described hereinabove by way of specific embodiments thereof, it can be modified, without departing from the nature and teachings of the subject invention as recited herein below in the claims.

The invention claimed is:

1. A weeding hand tool, comprising:
a handle grip;
a pedal;
a main tubular member joining said handle grip at a first end thereof and a pedal at a second opposite end thereof;
a finger head comprising coiled fingers arranged in a helix and an ejector rod mobile inside the helix, said ejector rod being mobile within a main shaft distinct from said main tubular member, the ejector rod supporting an ejector plate at a first end thereof; and
an ejector arm connected to a second end of said ejector rod, said ejector arm and said ejector plate being mobile in translation relative to said main tubular member, the coiled fingers being secured at the end of the main shaft and said helix being mobile in rotation about said main shaft;
wherein, when the tool is positioned generally vertically with free end tips of the coiled fingers on the ground, pushing down on at least one of said handle grip and said pedal causes said coiled fingers to rotated down into the soil, entrapping a weed beneath the soil as they penetrate the soil, and wherein when, by pulling up on said main tubular member, the coiled fingers are pulled out from the soil, with the weed entrapped in the helix they form, said unearthed entrapped weed is ejected from said helix by said ejector rod by pulling down on said ejector arm.

2. The tool of claim 1, wherein said helix formed by said coiled fingers is mobile in rotation in one direction and blocked in the opposite direction.

3. The tool of claim 1, wherein said ejector plate is driven down the helix towards the free end tips of said fingers by pulling down on said ejector arm.

4. The tool of claim 1, wherein said ejector arm is a sleeve sliding about said main tubular member.

5. The tool of claim 1, wherein said finger head comprises a ratchet assembly.

6. The tool of claim 1, wherein said coiled fingers are made in one of stainless steel, alloyed steel, engineered plastics, aluminum and titanium.

7. The tool of claim 1, wherein said coiled fingers have a hardness comprised between 38 and 58 Rockwell hardness C.

8. The tool of claim 1, wherein each finger has a thickness between 0.0625" and 3/16".

9. The tool of claim 1, wherein each finger has a fin-shaped profile.

10. The tool of claim 1, wherein each finger is coiled on about 150° over 4 inches.

11. The tool of claim 1, wherein said finger head comprises three coiled fingers.

12. The tool of claim 1, wherein said finger head comprises three coiled fingers, each finger having a varying section between about 0.1" and about 9/16", a length of about 3.75", with a pitch of about 42.67 degrees per inch and a thickness of about 12", the helix having an inside diameter of about 1".

13. The tool of claim 1, wherein said finger head comprises three coiled fingers, each finger having a generally constant section, a length of about 3.75", with a pitch of about 42.67 degrees per inch, a thickness of about 0.12", the helix having an inside diameter of about 1".

14. The tool of claim 13, wherein said generally constant section is higher than about 0.375".

15. The tool of claim 13, wherein said generally constant section is comprised between about 0.5" and about 0.7".

16. The tool of claim 1, wherein each finger has a length comprised between about 2" and about 4.5".

17. The tool of claim 1, wherein each finger has a pitch comprised between about 54 degrees/inch and about 38 degrees/inch.

18. The tool of claim 1, wherein at least one finger comprises at least one rib at the free tip end thereof.

19. The tool of claim 1, wherein said fingers have outwardly beveled free end tips.

20. The tool of claim 1, wherein the helix formed by the coiled fingers has an inner diameter of about 1+/−0.25 inch.

21. The tool of claim 1, wherein said ejector rod has a course limited between an upper stop and a lower stop.

* * * * *